Aug. 3, 1948.   W. F. BARTHOLOMEW   2,446,321
VEHICLE SUPPORT
Filed Oct. 23, 1944
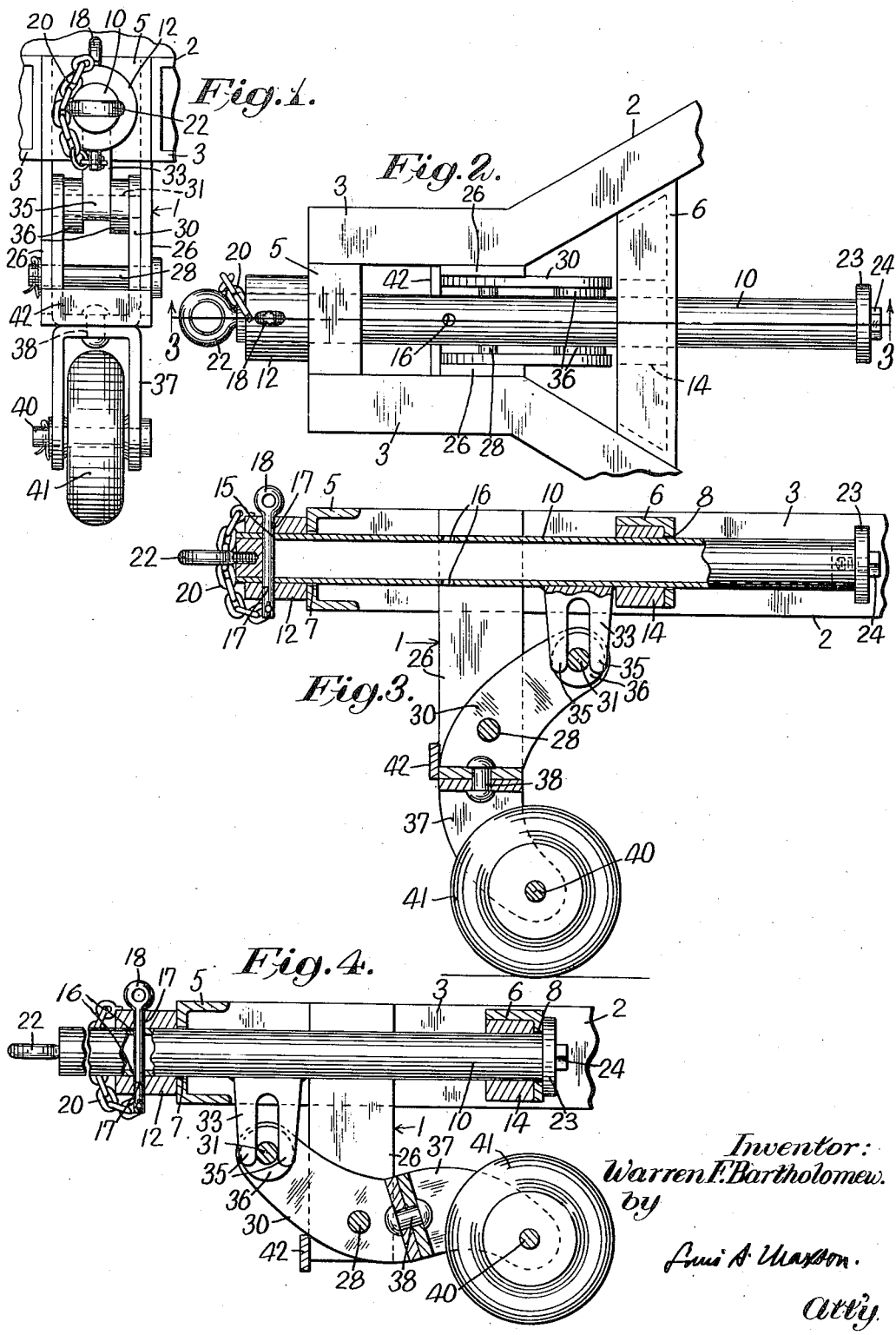
Inventor:
Warren F. Bartholomew.
by
[signature]
Atty.

Patented Aug. 3, 1948

2,446,321

UNITED STATES PATENT OFFICE 2,446,321

VEHICLE SUPPORT

Warren Frederick Bartholomew, Michigan City, Ind., assignor to Joy Manufacturing Company, a corporation of Pennsylvania Application October 23, 1944, Serial No. 560,082

7 Claims. (Cl. 280—33.05)

My invention relates to adjustable supporting devices for vehicles which are adapted to be towed from place to place, and more particularly to an adjustable supporting wheel assembly for a trailer.

When a two wheel trailer is disconnected from its towing vehicle, it is frequently desirable that the body of the trailer be supported in a substantially horizontal position. In order that the trailer may be moved about easily when it is detached and while it is supported in such position, the supporting means should have a swivel wheel which engages the ground. While the trailer is being towed, the supporting means or swivel wheel should be held in a raised position free from engagement with the ground.

An object of my invention is to provide an improved supporting means for a trailer. Another object is to provide for a trailer an improved means which is engageable with the ground for supporting the trailer in a desired position when the latter is detached from its towing vehicle. Still another object is to provide an improved supporting means operatively connected to the towing bar of a trailer so that a movement of the bar relative to the trailer causes the supporting means to be raised or lowered relative to the ground. Yet another object is to provide an improved supporting wheel assembly for a trailer, the assembly being moved by a pull on the towing bar to raise the wheel from the ground and then locked in its new position. Still another object is to provide for a trailer an improved supporting wheel assembly which is positioned by forces acting on the towing bar and is adapted to be locked in its different positions. Other objects will appear in the course of the following description.

In the accompanying drawing there is shown for purposes of illustration one form which my invention may assume in practice.

In this drawing:

Fig. 1 is a front elevational view of my improved supporting wheel assembly.

Fig. 2 is a plan view of the assembly shown in Fig. 1.

Fig. 3 is a longitudinal vertical sectional view taken on the plane of the line 3—3 of Fig. 2.

Fig. 4 is a view like that of Fig. 3 but showing parts in positions to hold the supporting wheel raised.

In the illustrative embodiment of the invention there is shown a supporting wheel assembly, generally designated 1, carried by the front end of the frame 2 of a trailer, not shown.

The frame 2 shown herein includes side channel members 3, 3 connected together by transversely extending channel members 5 and 6. Formed in the members 5 and 6 are alined openings 7 and 8 through which a tow bar 10 extends. Attached to the channel members 5 and 6, respectively, are bearing blocks 12 and 14 supporting the tow bar 10 for longitudinal reciprocation. Extending transversely through the tow bar at points spaced longitudinally thereof are openings 15 and 16 which are adapted to cooperate with openings 17 in the bearing member 12 so as to receive a locking pin 18 for holding the tow bar in either a retracted or an extended position. A chain 20 is connected at one end to the bearing member 12 and is adapted to be connected at its other end to the locking pin for holding the latter in its locking position. The forward end of the tow bar is shown herein as having an eye bolt 22 by means of which it is connected to a towing vehicle, and the rear end of the tow bar has a plate 23 connected thereto, as by a bolt 24, for preventing forward withdrawal of the tow bar from the bearing block 14.

Attached to the inner sides of the frame members 3 are plates 26 which project downwardly below the frame and support adjacent their lower ends a pivot pin 28. Pivotally mounted on the pin 28 is a U-shaped support member 30 having the upper ends of its side portions connected by a rod 31. Fixed, as by welding, to the tow bar 10 is a radially projecting member 33 having finger portions 35 which straddle the rod 31. Mounted on the rod 31 at opposite sides of the finger portions 35 are washers 36 for holding the finger portions in a centered position on the rod. Arranged beneath the member 30 is a U-shaped member 37 having its middle portion pivotally connected by a pin 38 to the lower portion of the member 30. A shaft 40 extends between the side portions of the member 37 and rotatably supports a wheel 41. Connected to the plates 26 adjacent their lower ends is a transversely extending plate member 42 which is engageable by the member 30 for limiting the swinging of the latter in both directions about the pivot pin 28.

When the parts are in the position shown in Fig. 3 the wheel 41 is in a position to engage the ground and is locked in such position by reason of the locking pin 18 extending through the openings 15 and 17 in the tow bar 10 and the bearing member 12, respectively. When it is desired to tow the trailer, the locking pin 18 is removed. A pull on the tow bar causes the latter to move forwardly in the bearing members 12 and 14. As the tow bar moves forwardly, the finger portions 35 act against the rod 31 to swing the member 30 about the pin 28 and cause the wheel 41 to be raised from the ground. When the tow bar has moved forward to the point where the openings 16 line up with the openings 17, the locking pin 18 is inserted through these openings for holding the tow bar in its extended position. The extended tow bar may be connected to the towing vehicle. It will be appreciated that the weight of the wheel is not so great but what the tow bar may be moved manually to raise the wheel, if desired. To lower the wheel again it is only necessary to remove the locking pin 18 and to release the tow bar so that it moves freely in the bearing members. The weight of the wheel and its supporting members is ordinarily sufficient to retract the tow bar. When the openings 15 and 17 are again lined up, the locking pin may be inserted through them to hold the wheel in its lowered position.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A support assembly for a trailer, comprising, in combination, an elongated supporting member movable into supported engagement at its lower end with the ground surface, means pivotally connecting said supporting member at a point between its ends to the trailer for swinging movement in vertical planes about an axis extending transversely thereof, a tow member by which the trailer is towed and constituting the sole connection between the trailer and its towing means, said tow member being supported by the trailer for limited movement longitudinally relative thereto, and a member fixed to said tow member and operatively engaging the upper end of said supporting member for swinging the latter on its pivotal connecting means to raise the ground-supported end thereof into a transport position on forward longitudinal movement of said tow member relative to the trailer as the result of the application of a forward pull to said tow member.

2. A support assembly for a trailer comprising, in combination, an elongated supporting member, means pivotally connecting said supporting member at a point between its ends to the trailer frame for swinging movement about an axis extending transversely of the frame, a wheel carrying member pivotally connected to the lower end of said supporting member, a tow member supported by the frame for limited movement relative thereto, and means operatively connecting said tow member to the upper end of said supporting member for swinging the latter about said pivotally connecting means and effecting a raising and lowering of said wheel carrying member on movement of said tow member relative to the frame.

3. A support assembly for a trailer comprising, in combination, an elongated supporting member, means pivotally connecting said supporting member at a point between its ends to the trailer frame for swinging movement about an axis extending transversely of the frame, a wheel carrying member pivotally connected to the lower end of said supporting member, a tow member supported by the frame for limited movement relative thereto, means operatively connecting said tow member to the upper end of said supporting member for swinging the latter about said pivotally connecting means and effecting a raising and lowering of said wheel carrying member on movement of said tow member relative to the frame, and means for locking said supporting member when said wheel carrying member is in its raised and lowered positions.

4. A support assembly for a trailer, comprising, in combination, an elongated supporting member movable into supported engagement at its lower end with the ground surface, means pivotally connecting said supporting member at a point between its ends to the trailer for swinging movement in vertical planes about an axis extending transversely thereof, a tow member constituting the sole connection between the trailer and its towing means and supported by the trailer for limited longitudinal movement relative thereto, and a member fixed to said tow member and projecting laterally therefrom to engage the upper end of said supporting member in a manner to swing the lower ground-supported end thereof upwardly on said pivotal connecting means on forward movement of said tow member relative to the trailer as the result of the application of a forward pull to said tow member.

5. A support assembly for a trailer comprising, in combination, an elongated supporting member, means pivotally connecting said supporting member at a point between its ends to the trailer for swinging movement about an axis extending transversely of the trailer, a tow member supported by the trailer for movement relative thereto in a plane extending longitudinally thereof, and a member fixed to said tow member and having finger portions adapted to engage opposite surfaces at the upper end of said supporting member for swinging the latter about said pivotally connecting means during movement of said tow member in said plane.

6. A support assembly for a trailer comprising, in combination, an elongated supporting member, means pivotally connecting said supporting member at a point between its ends to the trailer for swinging movement about an axis extending transversely of the trailer, a tow member supported by the trailer for movement relative thereto in a plane extending longitudinally thereof, a member fixed to said tow member and having laterally projecting finger portions adapted to engage opposite sides of a rod fixed to the upper end of said supporting member for swinging the latter about said pivotally connecting means during movement of said tow member in said plane, and means for locking said tow member against movement relative to the trailer when the lower end of said supporting member is in raised or lowered positions.

7. A supporting device for a wheeled trailer vehicle, comprising a movable towing element guided for limited longitudinal movement on the vehicle and constituting the sole connection between the vehicle and its towing means, a swiveled caster wheel engageable with the ground surface, a support carrying said caster wheel and mounted on the vehicle for movement relative thereto, and operative connections between said support and said towing element for raising said caster wheel into a transport position on forward longitudinal movement of said towing element as the result of the application of a forward pull to said towing element.

WARREN FREDERICK BARTHOLOMEW.

REFERENCES CITED

The following references are of record in the file of this patent:

UNITED STATES PATENTS

| Number | Name | Date |
| --- | --- | --- |
| 1,838,868 | Reid | Dec. 29, 1931 |
| 2,135,205 | Wilson | Nov. 1, 1938 |